Jan. 22, 1946.                D. A. MILLER                2,393,498
                              SEPARATOR TANK
                           Filed Aug. 7, 1943
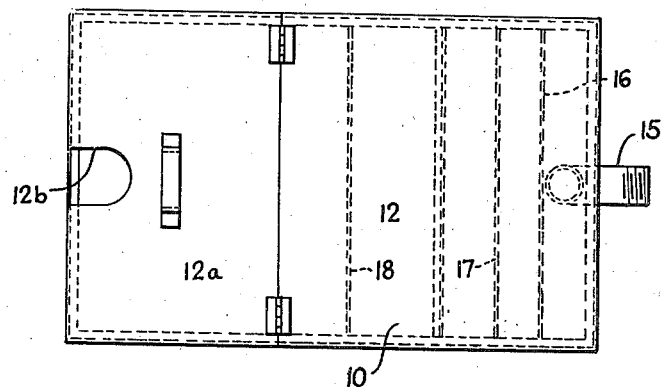
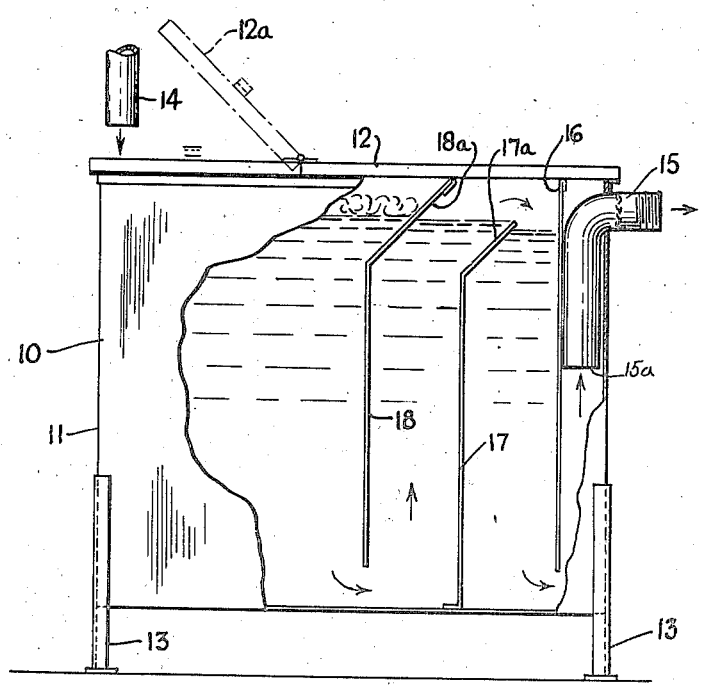
Inventor
DEWEY A. MILLER
By Ely & Frye
Attorneys Patented Jan. 22, 1946

2,393,498

UNITED STATES PATENT OFFICE 2,393,498

SEPARATOR TANK

Dewey A. Miller, Akron, Ohio, assignor to The Firestone Tire & Rubber Company, Akron, Ohio, a corporation of Ohio Application August 7, 1943, Serial No. 497,865

2 Claims. (Cl. 210—60)

This invention relates to separator tanks, especially to tanks of the type adapted to separate lighter substances from a containing liquid; for example, such as can be used in separating newly coagulated synthetic rubber particles from their containing medium, where such particles have a specific gravity less than that of said medium.

In the manufacture of synthetic rubber, the final operation is to coagulate the rubber latex from its aqueous medium or liquor. Most of the rubber latex is coagulated quite rapidly and can readily be removed from its coagulant. However, the remaining effluent liquor contains crumbs or fines and an appreciable quantity of rubber latex that is not yet coagulated, which condition is especially true when using an alum base coagulant upon a synthetic rubber latex emulsion in a helical flight coagulator.

The rubber latex remaining in solution, after the major portion of rubber has been coagulated and removed from the solution, is of commercial value, if not contaminated by dirt, sewage or other deteriorating or undesirable materials so that its recovery, if not too costly, is expedient. Furthermore, the rubber latex should be removed from its aqueous medium or it will coagulate in and collect in the sewer system used therefor. Screens are unsatisfactory for use in removing the rubber latex since they do not hold the liquor for a sufficient period to complete the coagulation process while, also, they become clogged too easily. Permanent sumps, built in the base of the coagulation apparatus, have also been tried to allow the coagulation process to proceed to substantial completion before discarding the rubber liquor. One objection to such a device is that it is very difficult to keep clean and rubber therein is often contaminated with dirt or oil. Another is that the size of sump necessary for the purpose may be objectionable.

The general object of this invention is to provide an efficient easily-operated separator for use in coagulating dispersed vestigial rubber latex, and for removing fine rubber particles from a carrying liquid.

Another object of the invention is to provide a novel, low-cost separator for residual rubber fines and rubber latex in synthetic rubber manufacture.

The foregoing and other objects will be made apparent by the following description of the invention when considered in light of the accompanying drawing, in which:

Figure 1 is a plan of a separator embodying the invention; and

Figure 2 is an elevation of the separator of Figure 1, a part thereof being broken away.

Referring specifically to the drawing, a separator 10 is shown, which includes a liquid-tight, sheet metal tank 11 having a cover 12, that usually is secured thereto. The tank 11 may be made from sheet steel and is reinforced and supported by angular posts 13 secured to the lower corners thereof. One section 12a of the cover 12 is hinged to the remainder of the cover to enable a portion of the cover to be opened to facilitate removal of material from the tank, or the pouring of liquids into the separator 10 through a pipe 14 associated therewith. A hole 12b is formed in the cover section 12a so that liquid can flow into the tank 11 without opening the cover section 12a. A second pipe 15 is secured to the tank 11 at the end thereof removed from the hinged cover portion 12a for exhausting liquids from the tank. Note that the pipe 15 extends downwardly inside the tank and that its open end 15a is appreciably below the liquid level of the tank 11.

A suitable number of baffle plates 16, 17, and 18 are in position in the tank 11 and extend completely across same to control and regulate flow of liquid through the tank. Figure 2 clearly shows that the baffle plate 16 is secured to the cover 12 immediately adjacent the pipe 15 and that the baffle extends downwardly of the tank appreciably further than the pipe so that only the heavier portions of liquids in the tank can flow into the pipe 15. The baffle plate 17 is adjacent the baffle plate 16 and extends up in the tank 11 to a point near the top thereof, while the baffle plate 18 is secured to the cover 12 and extends to a point adjacent the bottom of the tank. Both the baffle plates 17 and 18 have portions 17a and 18a, respectively, that are inclined from the base of the tank 11 towards the pipe 15 to form a relatively large surface area in the receiving end of the tank and a relatively small surface area in the portion of the tank adjacent the discharge end.

It will be seen that a liquid, such as effluent rubber liquor, can be poured into the separator 10 when the cover area 12a is opened and then only the heavier portion of the liquor flows under the baffle plate 18, over the baffle plate 17, under the baffle plate 16, and out of the tank through the pipe 15. Of course, the volume flow of liquid through the tank must be of such a rate that substantially all of the residual rubber emulsion in the liquor is coagulated while in the tank. Also, the rate of flow should not be such as to prevent the lighter rubber particles, or fines, from rising to the surface.

Synthetic rubber of the Buna types have a specific gravity lighter than water and will therefore normally rise to the surface. Rubber collecting on the surface of the liquid in the tank 10 normally will all be in the compartment under the cover section 12ª and can be skimmed therefrom periodically. In some instances it may be desirable to expose the portion of the tank 11 adjacent the pipe 15 so that the portion of the cover 12 thereabove may also be made removable. It also is possible to arrange for mechanical means for removing the rubber particles collecting on the surface of the liquid in the tank, when desired.

The separator 10, it will be seen, can be used to recover rubber crumbs or fines from the residual liquor from pelletizers and disintegrators as well as from coagulators.

When there is not appreciable dirt, oil or other foreign material around the separator, it sometimes may be desired to leave the top of the separator open. In such case, some of the baffles would have to extend up the sides of the separator above the normal liquid level while the alternate baffles would be secured to the sides and bottom of the separator tank, as usual.

While one embodiment of the invention has been fully explained and described herein, it will be apparent that modification thereof can be made without departing from the scope of the invention as defined in the appended claims.

What is claimed is:
1. A separator for fine rubber particles carried in a liquid, which separator comprises a tank having a bottom and a vertical wall connected thereto, said tank adapted to receive liquids at one region thereof, an exhaust pipe extending through the vertical wall at a region which is spaced from the liquid receiving region of the tank, and a plurality of baffle plates secured to and extending across the tank between the liquid receiving portion thereof and the exhaust pipe, a single plate of the baffle plates being secured to the bottom of the tank and extending in a generally vertical direction therefrom to an elevation slightly above the lower inside surface of the exhaust pipe at the region of its extension through the tank wall, a baffle plate being spaced on either side of said single plate and extending downwardly from a horizontal plane in the upper region of the tank and above the top of said single plate and terminating in a region spaced above the bottom of the tank, the plate which is adjacent to the liquid receiving region of the tank being inclined in its upper part in a directon away from said liquid receiving region thereby forming a large rubber collecting area in the initial compartment of the tank.

2. A separator as in claim 1, wherein the single plate attached to the bottom of the tank has its upper part inclined toward the wall of the tank through which the exhaust pipe passes.

DEWEY A. MILLER.